Dec. 22, 1942.   C. S. WEYANDT   2,305,943
ELECTRICALLY OPERATED VIBRATORY APPARATUS
Filed June 14, 1941
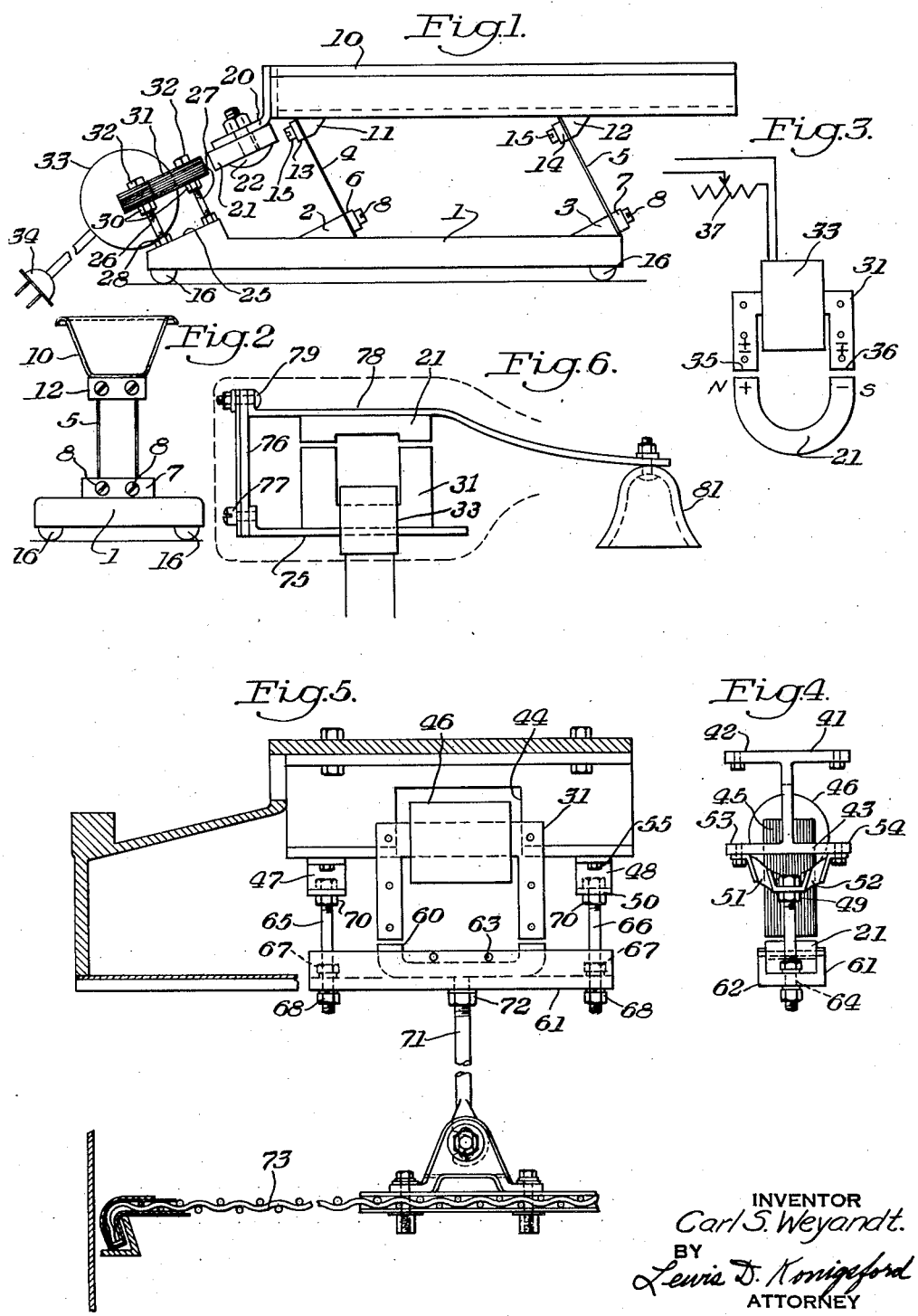
INVENTOR
Carl S. Weyandt.
BY
Lewis D. Konigsford
ATTORNEY Patented Dec. 22, 1942

2,305,943

UNITED STATES PATENT OFFICE 2,305,943

ELECTRICALLY OPERATED VIBRATORY APPARATUS

Carl S. Weyandt, Homer City, Pa.

Application June 14, 1941, Serial No. 398,073

6 Claims. (Cl. 172—126)

This invention relates to electrically operated vibratory apparatus and to the motor for operation thereof.

It heretofore has been proposed to operate vibratory electric apparatus directly from an alternating current source, but this has a number of disadvantages. Where a sixty cycle source, which is the most common, is used to operate the vibratory apparatus, the vibrations occur at the rate of 7200 per minute and even though the springs have a natural periodicity of about the frequency of the flux impulses, which is necessary to get any useful amplitude, the amplitude is rather small. Another disadvantage is the strength or stiffness of the springs required to maintain vibration at such high frequencies. Further, it is a vibrational characteristic that a high frequency of vibration tends to set up sympathetic vibrations in adjacent bodies which have natural periods equal to or an integral division of the frequency of the source, and it will be apparent that the higher the frequency of the source the greater are the possibilities of setting up sympathetic vibrations in surrounding objects. Also, having the springs with a natural period close to the period of the current impulses tends to produce an electromechanical resonance condition which renders the apparatus sensitive to disturbing influences.

It has been proposed to overcome some of these disadvantages by actuating the motor by spaced current impulses obtained by a rectifier from an alternating current source. However, while such devices have been successful, the rectifier is expensive, especially on small installations. It also has been proposed to employ a combination of alternating current and direct current, but this requires special generating equipment to produce the direct current, and furthermore is expensive to maintain.

It is an object of the present invention to provide a vibratory electrical apparatus which may be operated directly from a source of alternating current at a lower frequency of vibration than the current source.

A further object is the provision of a vibratory electric apparatus having high current efficiency, which is easily controlled, and which is inexpensive to manufacture.

In accordance with the present invention, I provide a vibratory electric apparatus comprising a permanent magnet which may be secured to the object or article to be vibrated to vibrate therewith and an electromagnet which may be actuated from any source of alternating electric current. The electromagnet may be secured to a base to which the permanent magnet may be secured through springs or other resilient members and the base may be attached to the object to be vibrated, or the permanent magnet may be so attached. Preferably the natural periodicity of the springs and permanent magnet carried thereby is within about ⅔ to ½ the frequency of the alternating current. For example, in operating a vibratory conveyor or a screen, I prefer to attach the permanent magnet to the trough or screen, and in vibrating a packer, bin or hopper, I may secure the base to the packer table, bin or hopper.

When connected for operation to a sixty cycle source of alternating current, the polarity of the electromagnet poles changes 7200 times a minute. However, half of this time the electromagnet poles are of unlike polarity as the poles of the permanent magnet and thus exert a mutually attractive force thereon, and the remainder of the time the electromagnet poles are of the same polarity as the poles of the permanent magnet and thus exert a mutually repulsive force thereon, so that the vibration rate is halved. Also, because of the energy of the permanent magnet, the current required for operation is considerably reduced. Other advantages are the longer amplitude of vibration that can be obtained, the simplicity of control by means of a rheostat, and the economy of elimination of a rectifier and the use of lighter springs.

The invention will be described in greater detail in the following specification taken in connection with the accompanying drawing, wherein is shown preferred embodiments of the invention by way of example, and wherein:

Figure 1 is a side elevation of a preferred modification of the invention applied to a conveyor, Figure 2 is an end elevation of Figure 1, Figure 3 diagrammatically shows the relation of the permanent magnet and the electromagnet, Figure 4 shows in end elevation the invention applied to a vibrator of general application, Figure 5 shows the embodiment of Figure 4 applied to a screen, and Figure 6 shows the invention applied to a surgical vibrator.

Referring to the drawing, there is shown a base 1 which may be of any suitable construction, such as an inverted channel casting, and has bosses 2 and 3 suitably spaced thereon. The bosses have inclined faces to which are secured by one end the wide leaf springs 4 and 5 by means of clamping bars 6 and 7 and bolts or screws 8. A trough 10 of any suitable shape preferably has a flat bottom and bosses 11 and 12 with inclined faces extending therefrom have the opposite ends of springs 4 and 5 secured thereto by clamping bars 13 and 14 and bolts or screws 15. In place of the leaf springs shown, any other suitable type of resilient means may be employed. To the base are secured pads 16 of rubber or other suitable resilient material, and it will be apparent that the trough 10 is mounted by springs 4 and 5 to the base so as to allow vibratory movement thereof with vertical and horizontal components, so that material placed on the trough will be conveyed from left to right. The rear closed end of the trough 10 has an inclined flange 20 which is bored at its center and a permanent U-shaped magnet 21 is clamped to this flange by a large head bolt 22 which engages the magnet. The permanent magnet 21 may be made of "Alnico" or other suitable known alloy of high magnetic retentivity.

The rear end of the base 1 has an inclined portion 25 which is bored and threaded to receive pairs of bars 26 and 27 of non-magnetic material threaded into the base and locked in position by lock nuts 28. The upper ends of the bars also are threaded and receive locating nuts 30 upon which is placed a generally U-shaped laminated soft iron electromagnet 31 locked in position by the clamping nuts 32 on the bars 26 and 27. However, it will be understood that the electromagnet may be held in position in any other suitable manner. A coil of wire 33 is wound around the bottom bar of the electromagnet and the ends may be connected by wires to a suitable male electrical plug 34. The electromagnet 31 thus is held in position on the base with its pole faces 35 and 36 adjacent the poles N and S of the permanent magnet 21.

The plug 34 may be connected to the usual electric outlet of a commercial electric lighting system of 120 volts sixty cycle current, or to any other suitable source of alternating or pulsating current, and the amplitude of vibration may be controlled by a rheostat 37. When connected, for example, to a sixty cycle current source, the trough will be vibrated 3600 times per minute.

In the modifications shown in Figures 4 and 5, the base 41 is of general I shape in cross section, having a bottom flange 42 by which it may be secured to the object or body to be vibrated and a top flange 43 to which are secured the resilient members, as will hereinafter be described. The middle of the base is cut away, as indicated at 44 and a U-shaped electromagnet 31 of laminated soft iron is welded or otherwise secured to the base. A coil 46 is wound around the horizontal bar of the electromagnet.

The resilient members, indicated generally at 47 and 48, are of known construction and each comprise an inverted channel strip 49 of metal with a hole 50 formed therethrough at the middle, and pads 51 and 52 of rubber, "Neoprene," "Ameripol" or other suitable resilient material have one of their respective faces secured to each side of the channel strip 49 by vulcanization or in any other suitable manner. The pads are right and left hand and the faces thereof are substantially parallel. Angle strips 53 and 54 are vulcanized to the opposite faces of the pads 51 and 52 and bolts 55 passing through holes in the angle strips secure them to the flange 43 of the base. The two resilient members 47 and 48 are alike in construction.

The permanent magnet 21 is clamped between two non-magnetic plates or bars 61 and 62 by non-magnetic bolts 63 and at their ends the plates are separated and form holes 64. Bolts 65 and 66 pass through these holes and the bars are clamped thereto between lock nuts 67 and 68. The lower ends of bolts 65 and 66 are clamped to the channel strips of the resilient members by the head and a lock nut 70. It will thus be seen that the permanent magnet 21 is resiliently held with its poles N and S in alignment with the poles 35 and 36 of the electromagnet, and the resilient members 48 and 47 guide the permanent magnet in its vibratory movement.

As shown in Figure 4, the vibrator may be bolted by means of the flange 42 to a hopper bin, chute, mold or table which is to be vibrated, and the vibration of the permanent magnet 21 is transmitted by means of bolts or bars 65, 66 and resilient members 47 and 48 to the base 41 and thus to the object to be vibrated. In the case of a packer table, the table preferably is resiliently supported to vibrate. In Figure 5 I have shown the vibrator employed to vibrate a screen. In this modification the base 41 is bolted to a rigid frame or support and a bar 71 is secured to the armature by a nut 72 and is suitably connected to the screen held in a frame 74. In this modification the vibration of the permanent magnet 21 is transmitted by rod 71 to the screen to be vibrated.

In the modification shown in Figure 6 a plate 75 of non-magnetic material is suitably supported on a base and carries the electromagnet 31 and coil 33. A set of leaf springs 76 is secured to the plate 75 by screws 77 and at their ends is secured an arm 78 by the bolt 79. Arm 79 carries the permanent magnet 21. A cup 81 of rubber or other suitable material is suitably fastened adjacent the end of arm 78.

When the electromagnet is actuated the permanent magnet 21 is vibrated and carries with it the arm 78 and cup 81, the spring 76 serving to impart to the permanent magnet a natural period which is near the frequency of the alternating current source, and preferably is within about $2/3$ to $1\tfrac{1}{12}$ thereof.

What I claim as my invention and desire to secure by United States Letters Patent is:

1. The combination comprising a base, an electromagnet carried thereby, alternating current means for actuating said electromagnet, an alloy permanent magnet of high retentivity having its pole faces adjacent the electromagnet, and resilient means securing the permanent magnet to the base to allow substantially rectilinear vibratory movement thereof.

2. The combination comprising a base, an electromagnet carried thereby, alternating current means for actuating said electromagnet, a conveyor trough, an alloy permanent magnet of high retentivity having its pole faces adjacent the electromagnet and operatively secured to the conveyor trough, and resilient means supporting the conveyor trough from the base to allow substantially rectilinear vibratory movement thereof at a frequency half of the alternations of the alternating current means.

3. The combination comprising a base, an electromagnet carried thereby, alternating current means for actuating said electromagnet, a conveyor trough, a permanent magnet having its pole faces adjacent the electromagnet and secured to move with the conveyor trough, and inclined leaf springs supporting the conveyor trough from the base to allow substantially rectilinear vibratory movement thereof.

4. The combination comprising a frame, a base secured thereto, an electromagnet carried by the base, alternating current means for actuating said electromagnet, an alloy permanent magnet of high retentivity having its pole faces adjacent the electromagnet, resilient means securing the permanent magnet to the base to allow vibratory movement thereof, a screen, and means connecting the screen to the permanent magnet to be vibrated thereby.

5. The combination comprising a base, an electromagnet carried thereby, alternating current means for actuating said electromagnet, an alloy permanent magnet of high retentivity having its pole faces adjacent the electromagnet, and resilient means securing the permanent magnet to the base to allow substantially rectilinear vibratory movement thereof, said resilient means having a natural periodicity near the frequency of the alternating current.

6. The combination comprising a base, an electromagnet carried thereby, alternating current means for actuating said electromagnet, an alloy permanent magnet of high retentivity having its pole faces adjacent the electromagnet, an object to be vibrated, and resilient means connecting said object and permanent magnet to the base to allow vibrational movement thereof.

CARL S. WEYANDT.